United States Patent [19]

Bopp et al.

[11] Patent Number: 5,461,096
[45] Date of Patent: Oct. 24, 1995

[54] POLYPHENYLENE ETHER RESIN-CONTAINING COMPOSITIONS CONTAINING HIGH MOLECULAR WEIGHT POLYETHYLENE RESIN

[75] Inventors: Richard C. Bopp, West Coxsackie; Kim G. Balfour, Schenectady, both of N.Y.

[73] Assignee: General Electric Company, Pittsfield, Mass.

[21] Appl. No.: 149,170

[22] Filed: Nov. 8, 1993

Related U.S. Application Data

[63] Continuation of Ser. No. 816,326, Dec. 31, 1991, abandoned.

[51] Int. Cl.[6] .............................. C08K 5/523; C08K 5/03
[52] U.S. Cl. ........................ 524/145; 524/410; 524/412; 524/471; 525/132
[58] Field of Search ........................... 524/145, 410, 524/412, 471; 525/132

[56] References Cited

U.S. PATENT DOCUMENTS

| | | | |
|---|---|---|---|
| 3,361,851 | 1/1968 | Gowan | 525/132 |
| 4,107,232 | 8/1978 | Haaf et al. | 525/132 |
| 4,145,377 | 3/1979 | Bussink et al. | 524/145 |
| 4,166,055 | 8/1979 | Lee | 524/505 |
| 4,282,335 | 8/1981 | Sugio et al. | 525/132 |
| 4,332,714 | 6/1982 | Haaf et al. | 525/132 |
| 4,584,334 | 4/1986 | Lee et al. | 524/141 |
| 4,590,241 | 5/1986 | Hohlfeld | 525/132 |
| 4,767,819 | 8/1988 | Yokoyama et al. | 525/132 |
| 4,792,588 | 12/1988 | Suga et al. | 526/352 |
| 4,808,647 | 2/1989 | Abolins et al. | 524/141 |
| 4,814,383 | 3/1989 | Cunnigham | 525/240 |
| 4,972,035 | 11/1990 | Suja et al. | 526/352 |
| 5,043,374 | 8/1991 | Bohen et al. | 524/412 |
| 5,286,793 | 2/1994 | Cottis et al. | 525/132 |
| 5,296,540 | 3/1994 | Akiyama et al. | 525/133 |

FOREIGN PATENT DOCUMENTS

| | | |
|---|---|---|
| 0133487 | 2/1985 | European Pat. Off. . |
| 0327677 | 1/1988 | European Pat. Off. . |
| 329176 | 3/1989 | European Pat. Off. . |
| 2140685 | 1/1973 | France . |
| 5819353 | 2/1983 | Japan . |
| 60120746 | 6/1985 | Japan . |
| 1-139636 | 6/1989 | Japan . |
| 1-252645 | 10/1989 | Japan . |
| 2225563 | 9/1990 | Japan . |
| 3197538 | 8/1991 | Japan . |
| 2005285 | 4/1979 | United Kingdom . |

OTHER PUBLICATIONS

Caughlan et al—"UHMWPE"—Encyclopedia Polymer Science & Engineering–2nd ed., vol. 6, pp. 490–492 (1986).
J. R. Bourgeois et al "HMW–High Density Polyethylene" Modern Plastics, Mid–Oct. p. 75.
R. C. Miller, "UHMW Polyethylene" Modern Plastics Encyclopedia, vol. 66, No. 11, p. 75— (1989).
John W. Lyons—*Fire & Flammability*— pp. 1–14 (1970).

Primary Examiner—Veronica P. Hoke

[57] ABSTRACT

There are disclosed polyphenylene ether resin-based compositions containing high molecular weight polyethylene resin and polyphenylene ether flame-retarded resins which have been rendered non-dripping through the inclusion of a drip-inhibiting amount of high molecular weight polyethylene resin. Still more particularly, there are disclosed flame retardant modified polyphenylene ether resins, such as those containing high impact polystyrene, rendered non-dripping through the inclusion of a drip-inhibiting amount of high molecular weight polyethylene resin which has a weight-average molecular weight ($\overline{M}_w$) of greater than about 100,000.

12 Claims, No Drawings

POLYPHENYLENE ETHER RESIN-CONTAINING COMPOSITIONS CONTAINING HIGH MOLECULAR WEIGHT POLYETHYLENE RESIN

This is a continuation of application Ser. No. 07/816,326 filed on Dec. 31, 1991 now abandoned.

FIELD OF THE INVENTION

The present invention relates to polyphenylene ether resin-based compositions containing high molecular weight polyethylene resin and polyphenylene ether flame-retarded resins which have been rendered non-dripping through the inclusion of a drip-inhibiting amount of high molecular weight polyethylene resin. Still more particularly, the present invention relates to modified polyphenylene ether resins, such as those containing high impact polystyrene, rendered non-dripping through the inclusion of a drip-inhibiting amount of high molecular weight polyethylene resin which has a weight-average molecular weight ($M_w$) of greater than about 100,000.

BACKGROUND OF THE INVENTION

The polyphenylene ether resins are a well-known class of thermoplastic materials which are commercially available. Polyphenylene ether resins are flammable and require the use of additives to achieve a commercially acceptable degree of flame retardancy.

Polyvinyl aromatic resins, such as polystyrene or high impact polystyrene (HIPS), are another well-known class of thermoplastic materials which are commercially available. As with polyphenylene ether resins, the polystyrene resins, including HIPS, are flammable and require the use of additives to achieve a commercially acceptable degree of flame retardancy.

If a thermoplastic test bar held in a test stand burns vigorously enough for a sufficient time, the bar will gradually soften (absent an unexpected cross-linking reaction) and will begin to exhibit sagging. As the bar becomes softer and less viscous, a point will be reached at which the bottom portion of the bar will separate physically from the remainder of the bar retained in the test stand. This phenomenon of physical separation is known as "dripping" and poses danger in certain applications because the dripping resin can ignite adjacent materials.

In the prior art, blends of polyphenylene ether and HIPS have been effectively rendered self-extinguishing in the UL Subject 94 vertical burn test through the addition of aromatic phosphate esters. However, these flame-retarded self-extinguishing compositions sometimes fail in the UL Subject 94 5 V flammability test due to dripping and/or flaming resin which physically separates from the test bar.

Thus, in the prior art, there have been problems in the preparation of flame retardant compositions comprising a polyphenylene ether resin, alone, or in combination with a polystyrene resin (including HIPS) which do not form flaming drips when ignited with a direct flame.

Haaf et al., U.S. Pat. No. 4,107,232, found that it is possible to achieve a flame retardant, non-dripping polyphenylene ether composition by the addition of a flame retardant compound and from 0.1 to 0.25 parts by weight per 100 parts of the composition of polytetrafluoroethylene. The compositions are said to optionally include a vinyl aromatic resin which may be a homopolymer (e.g., styrene), modified homopolymer (e.g., rubber-modified, high impact polystyrene) and copolymers (e.g., styrene butadiene copolymers, ABS copolymers and styrene-butadiene block copolymers).

In Haaf et al., U.S. Pat. No. 4,332,714, there are disclosed drip-retardant, plasticized thermoplastic compositions comprising, in admixture, a polyphenylene ether resin, a plasticizer in an amount at least sufficient to provide a plasticized composition after molding, and a microfibrillar poly(tetrafluoroethylene) resin in an amount at least sufficient to render the thermoplastic composition non-dripping when molten.

Thus, in the prior art, polyphenylene ether resins have been rendered non-dripping through the use of polytetrafluoroethylene resin.

However, poly(tetrafluoroethylene) is extremely costly and is difficult to blend or melt compound into polyphenylene ether resin-based compositions as a "neat" additive (i.e. without the aid of a compounding aid) using currently available processing equipment. For example, "nesting" (a phenomenon wherein fibrils of PTFE are formed in the production apparatus) often occurs during low shear blending. Excessive die swell and surging result in "dropped strands" which are encountered when the poly(tetrafluoroethylene) is not homogeneously dispersed into such polyphenylene ether/polystyrene compositions during compounding.

In addition, while the halogen concentration in poly(tetrafluoroethylene)-modified flame retardant polyphenylene ether/polystyrene resins is very low, in view of the increase in regulatory concern over the toxicity and corrosivity of the combustion products of halogenated compounds in various end-use applications, for example, in telecommunication, computer and/or other business equipment, a need still exists to develop a cost effective, non-halogen-containing drip-inhibitor as an alternative to poly(tetrafluoroethylene) in polyphenylene ether-based resin compositions.

Gowan, U.S. Pat. No. 3,361,851 discloses the addition of low density polyethylene resin or polypropylene resin in concentrations of up to about 10% by weight in polyphenylene ether resin, and this has been shown to result in improvements in the impact strength and stress cracking resistance of the polyphenylene ether resins. It also has been shown that such low density polyethylene or polypropylene resin could be used in blends of polyphenylene ether resin/polystyrene resin for a broad range of processing and property improvements. However, at polyolefin concentrations greater than about 2% by weight, lamination was often seen in injection-molded parts.

Lee, Jr., U.S. Pat. No. 4,166,055, discloses that a styrene-butadiene copolymer (e.g., the Kraton® G block copolymers) could serve as an effective compatibilizer for polyphenylene ether/polyolefin blends.

To date, it is believed that the use of high molecular weight polyethylene resin as an additive to polyphenylene ether-based resin compositions has not been reported. In fact, there is no mention of use of these high molecular weight polyethylene resins as an additive of any sort in current product literature, or in two recent review articles. Caughlan et al., "UHMWPE" *Encyclopedia Polymer Science & Engineering*, 2nd Edition, Vol. 6, pp. 490–492 (1986); and Miller, "UHMWPE" Modern Plastics *Encyclopedia*, Vol. 66, No. 11, pp. 75–76 (1989).

SUMMARY OF THE INVENTION

Accordingly, the present invention provides, in one of its embodiments, thermoplastic compositions which comprise:
(a) polyphenylene ether resin; and
(b) high molecular weight polyethylene resin.

In another embodiment of the present invention, there are provided drip-retardant thermoplastic compositions which comprise:

(a) flame retardant polyphenylene ether resin; and (b) high molecular weight polyethylene resin in an amount sufficient to render component (a) non-dripping when molten.

Still further, the present invention provides, in an alternate embodiment, a method of rendering flame retardant polyphenylene ether resin non-dripping, said method comprising:

(a) adding to flame retardant polyphenylene ether resin, a high molecular weight polyethylene resin in an amount sufficient to render the flame retardant polyphenylene ether resin non-dripping.

In addition, the present invention provides, in still another embodiment, a drip-retardancy-conferring concentrate, adaptable for inclusion into a polyphenylene ether resin, said concentrate comprising:

(a) 5% to 70% by weight of high molecular weight polyethylene; and (b) 95% to 30% by weight of a suitable resin matrix. The concentrate provides for effective dispersion of the high molecular weight polyethylene in polyphenylene ether resin. The suitable resin matrix is generally a polymeric substance in which the high molecular weight polyethylene resin can be substantially homogeneously dispersed. Those skilled in the art will be able to ascertain such matrices without undue experimentation in view of the detailed description which follows, preferably a polymeric resin (such as polystyrene), or other substance which is compatible with polyphenylene ether resin.

DETAILED DESCRIPTION OF THE INVENTION

The term "polyphenylene ether resin" encompasses polyphenylene ether resins, per se, and combinations of polyphenylene ether resin/vinyl aromatic resin.

By way of illustration, certain of the polyphenylene ether resins, per se, are disclosed in Hay, U.S. Pat. Nos. 3,306,874 and 3,306,875 and in Stamatoff, U.S. Pat. Nos. 3,257,357 and 3,257,358. Also by way of illustration, certain of the polyphenylene ether resin/vinyl aromatic resin combination compositions are disclosed in Cizek, U.S. Pat. No. 3,383,435.

For brevity, the term "polyphenylene ether resin" as used throughout this specification and in the appended claims will include not only unsubstituted polyphenylene ether (made from phenol) but also polyphenylene ethers with various substituents. The term "polyphenylene ether resin" also includes polyphenylene ether copolymers, polyphenylene ether resin in combination with graft and block copolymers of alkenyl aromatic resins, especially vinyl aromatic resins, as disclosed below.

Suitable phenol compounds for the preparation of the polyphenylene ether resins, per se, may be represented by the general formula:

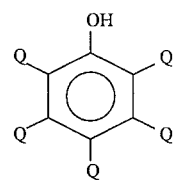

wherein each Q is a monovalent substituent individually selected from the group consisting of hydrogen, halogen, aliphatic and aromatic hydrocarbon and hydrocarbonoxy radicals free of a tertiary alpha-carbon atom and halohydrocarbon and halohydrocarbonoxy radicals free of a tertiary alpha-carbon atom and having at least two carbon atoms between the halogen atom and the phenyl nucleus, and wherein at least one Q is hydrogen.

As specific examples of the phenol compound represented by the above formula, there may be given phenol; o-, m- and p-cresols; 2,6-, 2,5-, 2,4- and 3,5-dimethylphenols; 2-methyl-6-phenyl-phenol; 2,6-diphenyl-phenol; 2,6-diethylphenol; 2-methylphenol; 2-methyl-6-ethyl-phenol; and 2,3,5-, 2,3,6- and 2,4,6-trimethylphenols. Two or more phenol compounds may be used in combination should copolymers be desired. Additionally, copolyphenylene ethers may also be prepared from a phenol compound of the above general formula with a phenol compound not represented by the above general formula including, for example, a dihydric phenol such as bisphenol-A, tetrabromobisphenol-A, resorcinol, or hydroquinone.

Illustrative of suitable polyphenylene ethers there may be given, for example, poly(2,6-dimethyl-1,4-phenylene) ether; poly(2-methyl-1,4-phenylene) ether;poly(3-methyl-1,4-phenylene) ether; poly(2,6-diethyl1,4-phenylene) ether; poly(2-methyl-6-allyl-1,4-phenylene ether); poly(2,6-dichloromethyl-1,4-phenylene) ether; poly(2,3,6-trimethyl-1,4-phenylene) ether; poly(2,3,5,6-tetramethylphenylene) ether;poly(2,6-dichloro-1,4phenylene) ether; poly(2,6-diphenyl-1,4-phenylene) ether; poly(2,5-dimethyl-1,4-phenylene) ether and the like. Further, as mentioned above, copolymers of the phenol compounds may also be used.

Preferred polyphenylene ethers will have the formula:

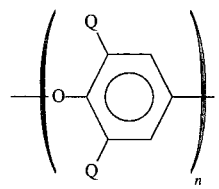

where Q is as defined above and n is at least 50, preferably from about 50 to about 200. Examples of polyphenylene ethers corresponding to the above formula can be found in the above referenced patents and include, among others: poly(2,6-dilauryl-1,4-phenylene) ether; poly(2,6-diphenyl-1,4-phenylene) ether; poly(2,6-dimethyoxy-1,4-phenylene) ether; poly(2,6-diethyoxy-1,4phenylene) ether; poly(2-methoxy-6-ethyoxy-phenylene) ether; poly(2-ethyl-6-stearyloxy-1,4-phenylene) ether; poly(2,6-dichloro-1,4-phenylene) ether; poly(2-methyl-6-phenyl-1,4-phenylene) ether; poly(2,6-dibenzyl-1,4-phenylene) ether; poly(2-ethoxy-1,4-phenylene) ether; poly(2-chloro-1,4-phenylene) ether; poly(2,6-dibromo-1,4-phenylene) ether; and the like.

For the purpose of the present invention, an especially preferred family of polyphenylene ethers include those having a $C_1$ to $C_4$ alkyl substitution in the two positions ortho to the oxygen ether atom. Illustrative members of this class are: poly (2,6-dimethyl-1,4-phenylene) ether; poly (2,6-diethyl-1,4-phenylene) ether; poly (2-methyl-6-ethyl-1,4-phenylene) ether; poly (2,6-dipropyl-1,4-phenylene) ether; poly (2-ethyl-6-propyl-1,4-phenylene ether); and the like; most preferably poly(2,6-dimethyl-1,4-phenylene) ether.

One method for the production of the above polyphenylene ethers is by the oxidation of a phenol compound by oxygen or an oxygen-containing gas in the presence of a catalyst for oxidative coupling. There is no particular limitation as to the choice of catalysts and any catalysts for oxidation polymerization can be employed. As typical examples of the catalyst, there may be given a catalyst comprising a cuprous salt and a tertiary amine and/or secondary amine, such as cuprous chloride-trimethylamine and dibutylamine, cuprous acetate-triethylamine or cuprous chloride-pyridine; a catalyst comprising a cupric salt, a tertiary amine, and an alkali metal hydroxide, such a cupric chloride-pyridine-potassium hydroxide; a catalyst comprising a manganese salt and a primary amine, such as manganese chloride-ethanolamine or manganese acetateethylenediamine; a catalyst comprising a manganese salt and an alcoholate or phenolate, such as manganese chloride-sodium methylate or manganese chloride-sodium phenolate; and a catalyst comprising a cobalt salt and a tertiary amine.

As stated above, the term "polyphenylene ether resin" encompasses those polyphenylene ether resin compositions which also include a vinyl aromatic resin.

The vinyl aromatic resins can be homopolymers or copolymers having at least 25% of their units derived from a monomer having the formula:

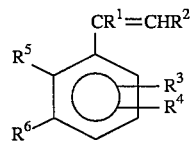

wherein $R^1$ and $R^2$ are selected from the group consisting of lower alkyl or alkenyl groups of from 1 to 6 carbon atoms and hydrogen; $R^3$ and $R^4$ are selected from the group consisting of chloro, bromo, hydrogen and lower alkyl of from 1 to 6 carbon atoms; $R^5$ and $R^6$ are selected from the group consisting of hydrogen and lower alkyl and alkenyl groups of from 1 to 6 carbon atoms or $R^5$ and $R^6$ may be concatenated together with hydrocarbyl groups to form a naphthyl group.

Materials that may be copolymerized with the units of the vinyl aromatic monomer include those having the general formula:

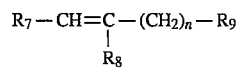

wherein $R_8$ and $R_7$ represent a substituent selected from the group consisting of hydrogen, halogen, an alkyl group of 1–4 carbon atoms, carboalkoxy, or $R_7$ and $R_8$ taken together represent an anhydride, vinyl, an alkyl or alkenyl group having 1 to 12 carbon atoms, cycloalkyl, carboalkoxy, alkoxy-alkyl, alkyl carboxy, ketoxy, halogen, carboxy, cyano or pyridyl and n is a whole number between 0 and 9.

The general formula set forth includes, by way of example: homopolymers, such as polystyrene and poly-monochlorostyrene; the modified polystyrenes, such as rubber-modified high impact polystyrene; and the styrene containing copolymers, such as the styrene-acrylonitrile copolymers, styrene-butadiene copolymers, styrene-acrylonitrile-α-alkyl styrene copolymers, styrene-acrylonitrile-butadiene copolymers, poly-α-methylstyrene, copolymers of ethylvinyl benzene, divinylbenzene styrene-maleic anhydride copolymers, and styrene-butadiene block copolymers.

The rubber modified high impact polystyrenes may be made with diene rubbers such as butadiene rubber, styrene-butadiene rubber, acrylonitrile rubber, ethylene-propylene copolymers or EPDM rubber.

Those polyphenylene ether resins which are recited as flame retardant according to one of the embodiments of the present invention have been rendered flame retardant, usually through the inclusion of a flame retardant component.

The nature of the flame retardant component is not critical and a single compound may be used. Optionally, it may be found desirable to use as the flame retardant component a mixture of two or more individual flame retardant compounds.

Among the useful flame retardant compounds are those of the formula:

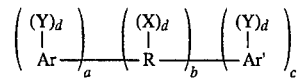

wherein R is an alkylene, alkylidene or cycloaliphatic linkage, e.g., methylene, ethylene, propylene, isopropylene, isopropylidene, butylene, isobutylene, amylene, cyclohexylene, cyclopentylidene, and the like; a linkage selected from the group consisting of ether, carbonyl, a sulfur-containing linkage (e.g., sulfide, sulfoxide, sulfone, carbonate) a phosphorous-containing linkage, and the like. R can also consist of two or more alkylene or alkylidene linkages connected by such groups as aromatic, ether, ester, carbonyl, sulfide, sulfoxide, sulfone a phosphorous-containing linkage, and the like. R can be a dihydric phenol, e.g., bisphenol-A carbonate linkage. Other groups which are represented by R will occur to those skilled in the art.

Ar and Ar' are mono- or polycarboxylic aromatic groups such as phenylene, biphenylene, terphenylene, naphthylene, and the like. Ar and Ar' may be the same or different.

Y is a substituent selected from the group consisting of organic, inorganic or organometallic radicals. The substituents represented by Y include: (1) halogen, e.g., chlorine, bromine, iodine, or fluorine; or (2) ether groups of the general formula, OE, wherein E is a monovalent hydrocarbon radical similar to X; or (3) monovalent hydrocarbon groups of the type represented by R; or (4) other substituents, e.g., nitro cyano, said substituents being essentially inert, provided that there is at least one, and preferably two, halogen atom(s) per aryl, e.g., phenyl, nucleus.

X is a monovalent hydrocarbon group exemplified by the following: alkyl, such as methyl, ethyl, propyl, isopropyl, butyl, decyl and the like; aryl, such as phenyl, naphthyl, biphenyl, xylyl, tolyl, and the like; aralkyl, such as benzyl, ethylphenyl, and the like; cycloaliphatic, such as cyclopentyl, cyclohexyl, and the like; as well as monovalent hydrocarbon groups containing inert substituents therein. It will be understood that where more than one X is used they may be alike or different.

The letter "d" represents a whole number ranging from 1 to a maximum equivalent to the number of replaceable hydrogens substituted on the aromatic rings comprising Ar or Ar'.

The letter "c" represents a whole number ranging from 0 to a maximum controlled by the number of replaceable hydrogens on R. The letters "a", "b", and "c" represents whole numbers including 0. When "b" is not 0, neither "a" nor "c" may be 0. Where "b" is 0, the aromatic groups are joined by a direct carbon-to-carbon bond. The hydroxyl and Y substituents on the aromatic groups, Ar and Ar' can be varied in the ortho, meta or para positions on the aromatic rings and the groups can be in any possible geometric relationship with respect to one another.

Included within the scope of the above formula are diaromatics of which the following are representative:
2,2-bis-(3,5-dichlorophenyl) propane
bis(2-chlorophenyl) methane;
bis(2,6-dibromophenyl) methane;
1,1-bis-(4-iodophenyl) ethane;
1,2-bis(2,6-dichlorophenyl) ethane;
1,1-bis(2-chloro-4-iodophenyl) ethane;
1,1-bis(2-chloro-4-methylphenyl) ethane;
1,1-bis(3,5-dichlorophenyl) ethane;
2,2-bis(3-phenyl-4-bromophenyl) ethane;
2,3-bis(4,6-dichloronaphthyl) propane;
2,2-bis(2,6-dichlorophenyl) pentane;
2,2-bis(3,5-dichlorophenyl) hexane;
bis(4-chlorophenyl) phenylmethane;
bis(3,5-dichlorophenyl) cyclohexylmethane;
bis(3-nitro-4-bromophenyl) methane;
bis(4-hydroxy-2,6-dichloro-3-methoxyphenyl) methane;
2,2-bis(3,5-dichloro-4-hydroxyphenyl) propane; and
2,2-bis(3-bromo-4-hydroxyphenyl) propane.

The preparation of these and other applicable biphenyls are known in the art. In place of the divalent aliphatic group in the above examples may be substituted sulfide, sulfoxy and the like.

Included within the above structural formula are substituted benzenes exemplified by tetrabromobenzene, hexachlorobenzene, hexabromobenzene, and biphenyls such as 2,2'-dichlorobiphenyl, 2,4'-dibromobiphenyl, 2,4'-dichlorobiphenyl, hexabromobiphenyl, octabromobiphenyl, decabromobiphenyl and halogenated diphenyl ethers, containing 2 to 10 halogen atoms.

The flame retardant compound may also be a phosphate.

In general, the preferred phosphate compounds are selected from elemental phosphorus or organic phosphonic acids, phosphonates, phosphinates, phosphinites, phosphine oxides, phosphines, phosphites or phosphates. Illustrative is triphenyl phosphine oxide. These can be used alone or mixed with hexabromobenzene or a chlorinated biphenyl and, optionally, antimony oxide, such as disclosed in Haaf, U.S. Pat. No. 3,639,506.

Typical of the preferred phosphorus compounds to be employed would be those having the general formula

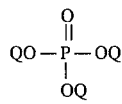

and nitrogen analogs thereof where each Q represents the same or different radicals including hydrocarbon radicals such as alkyl, cycloalkyl, aryl, alkyl substituted aryl and aryl substituted alkyl; halogen, hydrogen and combinations thereof provided that at least one of said O's is aryl. Typical examples of suitable phosphates include, phenylbisdodecyl phosphate, phenylbisneopentyl phosphate, phenylethylene hydrogen phosphate, phenyl-bis-3,5,5'-trimethylhexyl phosphate), ethyldiphenyl phosphate, 2-ethylhexyl di(p-tolyl) phosphate, diphenyl hydrogen phosphate, bis(2-ethyl-hexyl) p-tolylphosphate, tritolyl phosphate, bis(2-ethylhexyl)-phenyl phosphate, tri(nonylphenyl) phosphate, phenyl-methyl hydrogen phosphate, di(dodecyl) p-tolyl phosphate, tricresyl phosphate, triphenyl phosphate, isopropylated triphenyl phosphate, halogenated triphenyl phosphate, dibutylphenyl phosphate, 2-chloroethyldiphenyl phosphate, p-tolyl bis(2, 5,5'-trimethylhexyl) phosphate, 2-ethylhexyldiphenyl phosphate, and the like. The preferred phosphates are those where each Q is aryl. The most preferred phosphates are triphenyl phosphate, the alkylated triphenyl including isopropylated and butylated triphenyl phosphates, phosphates and mixtures thereof. It is also preferred to use triphenyl phosphate in combination with hexabromobenzene and, optionally, antimony oxide.

Also suitable for use as the phosphorous-containing flame retardant compounds are those difunctional and polyfunctional phosphate compounds disclosed in the literature which can include those generally referred to as resorcinol and/or quinone-based phosphorous compounds including bisphenyl phosphates of resorcinol or hydroquinone. Such difunctional and polyfunctional phosphate compounds are described in published U.K. Patent Application GB 2,043, 083A; and in U.S. Pat. No. 4,504,613; as well as in the U.S. patent application filed Jul. 11, 1990 as a continuation application of Ser. No. 429,165, filed Oct. 30, 1989. Other suitable phosphates are taught in U.S. Pat. No. 4,900,768.

Also suitable as flame-retardant additives are compounds containing phosphorus-nitrogen bonds, such as phosphonitrilic chloride, phosphorus ester amides, phosphoric acid amides, phosphonic acid amides or phosphinic acid amides. These flame-retardant additives are commercially available.

The preferred compounds are aromatic halogen compounds such as brominated benzene, chlorinated biphenyl, or a compound comprising two phenyl radicals separated by a divalent alkenyl group and having at least two chlorine or bromine atoms per nucleus, polycarbonates, chlorine containing aromatic polycarbonates, and mixtures of at least two of the foregoing.

Especially preferred are hexabromobenzene and triphenyl phosphate.

The high molecular weight polyethylene resins which are used as component (b) in the present invention are predominantly straight-chain, ethylene high polymers having weight-average molecular weights ($M_w$) greater than about 100,000, preferably greater than 250,000, and more preferably greater than 500,000 and up to about 6 million. Still more preferably, the molecular weight is in the range of greater than about 2 million up to about 6 million. Those high molecular weight polyethylene resins having a molecular weight in the range of from about 2 million to about 3 million are referred to herein as very high molecular weight (VHMW) polyethylene resins, while those having a molecular weight in the range of about 3 million to about 6 million are referred to herein as ultra high molecular weight (UHMW) polyethylene resins.

These high molecular weight polyethylene resins specifically exclude from within their ambit the typical polyethylenes which are often used in low amounts in polyphenylene ether resin compositions, primarily as mold-release agents.

These high molecular weight polyethylene resins exhibit exceptional abrasion resistance, low co-efficient of surface friction and very high impact strength, and are typically used in the manufacture of liners for trucks, trailers and rail cars, as well as for rollers, sprockets, gears and the like. *Himont Technical Information Bulletin* HPE-101A, "1900 Ultrahigh Molecular Weight Polymer", (General Information and Applications) (1989). Due to the unusually long chain length, VHMW and UHMW polyethylene resins exhibit a melt index of zero grams/10 minutes under standard test conditions. Consequently VHMW and UHMW polyethylene resins are not readily processable in the usual extrusion or injection molding equipment. In fact, Miller, referred to above, reports that efforts at screw extrusion of ultra high molecular weight polyethylene have resulted in polymer degradation or equipment damage. As a consequence, VHMW and UHMW polyethylene resins are usually extruded into sheet profiles via a ram extrusion process, or molded into specific shapes by cold forging, sintering or compression molding.

Generally, also, the high molecular weight polyethylenes which are utilized in the present invention are those wherein the intrinsic viscosity, as measured at 135° C. in decahydronaphthalene (also called decalin), is greater than 5 and up to about 30 and, preferably, is between about 14 and 30, with the intrinsic viscosity of the VHMW being within the range of about 14 to about 20, and the intrinsic viscosity of UHMW being within the range of about 20 to 30, or higher.

The amount of the high molecular weight polyethylene which can be incorporated into the presently claimed compositions varies. Applicants have found that in compositions comprised of polyphenylene ether resin/high impact polystyrene resin blends, no evidence of delamination in injected molten parts was seen in compositions containing up to the maximum amount of VHMW or UHMW polyethylene resin included into such compositions. Also, the use of VHMW or UHMW polyethylene resins in amounts of as low as about 0.75 phr begins to show anti-dripping effects in the resin compositions tested while, generally, the use of high molecular weight (HMW), VHMW and UHMW polyethylene resins in amounts of between 3 phr to about 6 phr in compositions comprised of flame retardant polyphenylene ether resin/polystyrene resin blends substantially, and often completely, eliminates dripping in the UL 94 5 V flammability testing of $\frac{1}{16}$ inch injection molded bars.

The amount of polyphenylene ether resin can vary substantially as well. The polyphenylene ether resin can be used per se as the only polymeric resin in the compositions, or can be used in combination with a vinyl aromatic resin. When used in combination with a vinyl aromatic resin, all miscible ratios (i.e. from 1% to 99% by weight of polyphenylene ether resin and from 99% to 1% by weight of vinyl aromatic resin) are suitable for use in the present invention. Preferably, in such combinations of resins, the amount of polyphenylene ether resin will be greater than about 20%, more preferably greater than about 30%, and most preferably greater than about 50% by weight of the resin combination. Those skilled in the art will be able to determine, without undue experimentation, any variation in the amount of HMW, VHMW and/or UHMW polyethylene resin to be added to the resin compositions in order to effect one or more of the aspects of the present invention.

DESCRIPTION OF THE PREFERRED EMBODIMENTS

The following examples are illustrative of the compositions of the present invention. These are not intended to limit the invention in any manner.

An initial, three series of polyphenylene ether resin/high impact polystyrene resin compositions were formulated including zero, 0.75, 1.50, 3.00 and 6.00 phr of a polyethylene resin modifier.

In Series I, the formulations were modified with linear low density polyethylene (LLDPE) of Union Carbide, given the designation GRSN8320, and having a weight-average molecular weight of about 45,000.

In Series II, the formulations were modified with "ULTRAC®" VHMW polyethylene resin, supplied by Allied-Signal Corporation.

In Series III, the formulations were modified with "1900 UMHW™ polyethylene resin, supplied by Himont Chemical Company, Inc.

The compositions of the formulations are given in Tables 1–3 below. All samples were compounded on a 30 mm Werner-Pfleiderer twin-screw extruder. Test specimens were injection molded on a 75 ton Newbury reciprocating screw machine with a 500° F. barrel temperature profile and a 150° mold temperature. Mechanical and flame retardancy tests were carried out in accordance with appropriate ASTM or UL procedures.

TABLE 1

SERIES I
LLDPE SAMPLE FORMULATIONS (parts by weight)

| COMPONENT | 1 | 2 | 3 | 4 | 5 |
|---|---|---|---|---|---|
| POLYPHENYLENE ETHER | 60 | 60 | 60 | 60 | 60 |
| HIGH IMPACT POLYSTYRENE | 37 | 37 | 37 | 37 | 37 |
| TRIPHENYL PHOSPHATE | 18 | 18 | 18 | 18 | 18 |
| TRIDECYLPHOSPHITE | 0.5 | 0.5 | 0.5 | 0.5 | 0.5 |
| ZnO | 0.15 | 0.15 | 0.15 | 0.15 | 0.15 |
| ZnS | 0.15 | 0.15 | 0.15 | 0.15 | 0.15 |
| LLDPE ($\bar{M}_w = 4.5 \times 10^4$) | 0.0 | 0.75 | 1.50 | 3.00 | 6.00 |

TABLE 2

SERIES II
"ULTRAC ®" VHMWPE SAMPLE
FORMULATIONS (parts by weight)

| COMPONENT | 6 | 7 | 8 | 9 |
|---|---|---|---|---|
| POLYPHENYLENE ETHER | 60 | 60 | 60 | 60 |
| HIGH IMPACT POLYSTYRENE | 37 | 37 | 37 | 37 |
| TRIPHENYL PHOSPHATE | 18 | 18 | 18 | 18 |
| TRIDECYLPHOSPHITE | 0.5 | 0.5 | 0.5 | 0.5 |
| ZnO | 0.15 | 0.15 | 0.15 | 0.15 |
| ZnS | 0.15 | 0.15 | 0.15 | 0.15 |
| ULTRAC ® VHMW POLYETHYLENE ($\bar{M}_w = 2.0 - 3.0 \times 10^6$) | 0.75 | 1.50 | 3.00 | 6.00 |

TABLE 3

SERIES III
HIMONT 1900 UHMWPE SAMPLE
FORMULATIONS (Parts by weight)

| COMPONENT | 10 | 11 | 12 | 13 |
|---|---|---|---|---|
| POLYPHENYLENE ETHER | 60 | 60 | 60 | 60 |
| HIGH IMPACT POLYSTYRENE | 37 | 37 | 37 | 37 |
| TRIPHENYL PHOSPHATE | 18 | 18 | 18 | 18 |
| TRIDECYLPHOSPHITE | 0.5 | 0.5 | 0.5 | 0.5 |
| ZnO | 0.15 | 0.15 | 0.15 | 0.15 |
| ZnS | 0.15 | 0.15 | 0.15 | 0.15 |
| 1900 UHMW ™ ($\bar{M}_w = 3.0 - 6.0 \times 10^6$) | 0.75 | 1.50 | 3.00 | 6.00 |

The mechanical properties and flammability characteristics of the samples in Series I, II and III are given in Tables 4 and 5.

The effects of polyethylene modification on mechanical properties were similar in all three series of examples, with the exception of impact strength.

Increasing polyethylene resin concentrations tended to increase the average flame out time (FOT), i.e. reduced flame resistance, in the UL 94 vertical burn test, causing a change in most cases from a V-0 rating to a V-1 rating at about 3 phr of polyethylene resin.

All samples in Series I fail the UL Subject 94 5 V test at 1/16 inch thickness due to dripping.

Samples modified with the VHMW or UHMW polyethylene resins at concentrations equal to or greater than 3 phr do not drip and thereby pass the test.

0.75, 1.50, 2.00, 2.50, and 3.00 phr of the indicated polyethylene modifier. The formulations in parts by weight were the same as set forth in Tables 1, 2 and 3, above, with the exception that the phosphorous-containing flame retardant was comprised substantially of butylated triphenyl phosphate.

The flammability characteristics of the samples are given in Table 6.

TABLE 4

MECHANICAL PROPERTIES AND FLAMMABILITY PERFORMANCE FOR
POLYETHYLENE MODIFIED FLAME RETARDANT PPE/HIPS FORMULATIONS

| | SERIES I | | | SERIES II | | SERIES III | |
|---|---|---|---|---|---|---|---|
| SAMPLE | 1 | 2 | 3 | 6 | 7 | 10 | 11 |
| NOTCHED IZOD IMPACT (FT-LBS/IN) | 4.3 | 4.5 | 4.9 | 3.0 | 2.4 | 2.5 | 2.1 |
| DYNATUP IMPACT (FT-LBS) | 25.2 | 30.8 | 38.8 | 19.5 | 17.3 | 16.8 | 16.8 |
| HDT @ 264 PSI (°F.) | 190 | 191 | 189 | 184 | 187 | 189 | 183 |
| TENSILE STRENGTH (PSI) | 8000 | 7900 | 7900 | 7900 | 7900 | 7800 | 7608 |
| % ELONGATION | 28 | 30 | 37 | 29 | 28 | 28 | 25 |
| FLEXURAL MODULUS (KPSI) | 365 | 359 | 356 | 358 | 352 | 357 | 351 |
| FLEXURAL STRENGTH (KPSI) | 12.5 | 12.2 | 12.0 | 12.5 | 12.2 | 12.5 | 12.3 |
| FLOW CHANNEL (IN) | 17.5 | 18.0 | 18.0 | 17.0 | 17.0 | 17.0 | 17.5 |
| UL94 VERTICAL BURN (1/16 IN) | | | | | | | |
| AVG FOT (SEC) | 3.8 | 3.4 | 3.8 | 3.3 | 3.7 | 2.8 | 3.6 |
| RATING | V-O | V-O | V-O | V-O | V-1 | V-O | V-O |
| UL94 5V FLAME TEST (1/16 IN) | | | | | | | |
| DRIP (YES/NO) | YES | YES | YES | YES | YES | YES | YES |
| RATING | FAIL | FAIL | FAIL | FAIL | FAIL | FAIL | FAIL |

TABLE 5

MECHANICAL PROPERTIES AND FLAMMABILITY PERFORMANCE FOR
POLYETHYLENE MODIFIED FLAME RETARDANT PPE/HIPS FORMULATIONS

| | SERIES I | | SERIES II | | SERIES III | |
|---|---|---|---|---|---|---|
| SAMPLE | 4 | 5 | 8 | 9 | 12 | 13 |
| NOTCHED IZOD IMPACT (FT-LBS/IN) | 5.4 | 6.0 | 2.0 | 1.8 | 1.7 | 1.5 |
| DYNATUP IMPACT (FT-LBS) | 37.9 | 33.2 | 16.2 | 14.1 | 14.1 | 14.0 |
| HDT @ 264 PSI (°F.) | 188 | 186 | 190 | 190 | 185 | 187 |
| TENSILE STRENGTH (PSI) | 7500 | 7900 | 7700 | 7500 | 7700 | 7400 |
| % ELONGATION | 40 | 52 | 29 | 24 | 17 | 16 |
| FLEXURAL MODULUS (KPSI) | 347 | 327 | 351 | 331 | 349 | 326 |
| FLEXURAL STRENGTH (KPSI) | 11.8 | 11.1 | 12.4 | 11.7 | 12.2 | 11.7 |
| FLOW CHANNEL (IN) | 18.0 | 19.0 | 15.5 | 14.0 | 16.5 | 15.0 |
| UL94 VERTICAL BURN (1/16 IN) | | | | | | |
| AVG FOT (SEC) | 3.7 | 5.6 | 3.4 | 4.9 | 4.3 | 4.6 |
| RATING | V-O | V-1 | V-O | V-1 | V-1 | V-1 |
| UL94 5V FLAME TEST (1/16 IN) | | | | | | |
| DRIP (YES/NO) | YES | YES | NO | NO | NO | NO |
| RATING | FAIL | FAIL | PASS | PASS | PASS | PASS |

An additional series of polyphenylene ether resin/polystyrene resin compositions was formulated including 0,

TABLE 6

| SAMPLE # | HIMONT "1900 UHMW ™PE" | ULTRAC® VHMWPE | PETROTHENE[1] HDPE | 5V DATA 1/16" BARS | UL-94 1/16" BAR FOT | UL RATING |
|---|---|---|---|---|---|---|
| 14[2] | | | | ALL DRIP AND BURN | 2.1 | V-O |
| 15 | .75 PARTS | | | 1 OF 5 PASS | 2.6 | V-O |
| 16 | 1.5 PARTS | | | 100% PASS | 4.0 | V-O |
| 17 | 2.0 PARTS | | | 100% PASS | 2.9 | V-O |
| 18 | 2.5 PARTS | | | 100% PASS | 5.2 | V-1[3] |
| 19 | 3.0 PARTS | | | 100% PASS | 3.8 | V-O |
| 20 | | .75 PARTS | | ALL DRIP AND BURN | 3.5 | V-O |
| 21 | | 1.5 PARTS | | 3 OF 5 PASS | 3.8 | V-O |
| 22 | | 2.0 PARTS | | 4 OF 5 PASS | 4.2 | V-O |
| 23 | | 2.5 PARTS | | 3 OF 5 PASS | 3.6 | V-O |
| 24 | | 3.0 PARTS | | 100% PASS | 3.4 | V-1[4] |
| 25 | | | .75 PARTS | ALL DRIP AND BURN | 3.6 | V-O |
| 26 | | | 1.5 PARTS | 1 OF 5 PASS | 3.5 | V-O |
| 27 | | | 2.0 PARTS | 2 OF 5 PASS | 2.5 | V-O |
| 28 | | | 2.5 PARTS | 3 OF 5 PASS | 2.9 | V-O |
| 29 | | | 3.0 PARTS | 4 OF 5 PARTS | 3.5 | V-O |

[1] PETROTHENE is a high density polyethylene resin manufactured by Quantum Chemical Corp. and having a weight average molecular weight of about 140,000.
[2] Sample 14 is a control composition containing no polyethylene.
[3] One burn of 20 had an 18 sec. burn time.
[4] One burn of 20 had an 11 sec. burn time.

The foregoing examples demonstrate the use of high molecular weight polyethylene resins in polyphenylene ether resin-based resin compositions.

Those compositions containing 0.75 phr or more of high molecular weight polyethylene generally begin to exhibit drip retardancy.

The above tests indicate that, unexpectedly, compositions comprising high molecular weight polyethylene resin which substantially maintain the physical and mechanical properties of the compositions are possible and still more surprising, the above tests indicate that the compositions of the present invention resist dripping or sagging during burning.

Obviously, other modification and variations of the present invention are possible in light of the above description. It is, therefore, to be understood that changes may be made in the particular embodiments disclosed herein which are encompassed within the scope of the invention as defined in the appended claims.

All of the above-mentioned patents are incorporated by reference herein.

What is claimed is:

1. A drip-retardant thermoplastic composition comprising:
    (a) flame retardant polyphenylene ether resin; and
    (b) high molecular weight polyethylene resin in an amount sufficient to render component (a) non-dripping when molten, said polyethylene resin having a weight average molecular weight of greater than 100,000.

2. A composition according to claim 1, wherein component (a) is rendered flame retardant through the use of a halogen-containing or phosphorous-containing compound.

3. A composition according to claim 2, wherein the flame retardant is a phosphorous-containing compound.

4. A composition according to claim 3, wherein the phosphorous-containing compound is selected from the group consisting of triphenyl phosphate, isopropylated triphenyl phosphate, butylated triphenyl phosphate and mixtures thereof.

5. A composition according to claim 2, wherein the flame retardant is a halogen-containing compound and is comprised of a halogen-containing vinyl aromatic resin.

6. A composition according to claim 1, wherein component (b) is present in an amount of from about 0.75 to about 6 weight percent, based on the weight of component (a).

7. A composition according to claim 1, wherein the high molecular weight polyethylene resin has a weight average molecular weight of greater than 2 million.

8. A composition according to claim 1, wherein the high molecular weight polyethylene resin has a weight average molecular weight of greater than 3 million.

9. The composition according to claim 1, wherein said high molecular weight polyethylene resin has a weight average molecular weight of greater than 250,000.

10. The composition according to claim 9, wherein said high molecular weight polyethylene resin has a weight average molecular weight of greater than 500,000.

11. The composition according to claim 10, wherein said high molecular weight polyethylene resin has a weight average molecular weight greater than 500,000 and up to about 6 million.

12. A method of rendering flame retardant polyphenylene ether resin non-dripping when molten, said method comprising:
    (a) adding to flame retardant polyphenylene resin a high molecular weight polyethylene resin in an amount sufficient to render the flame retardant polyphenylene resin non-dripping, said polyethylene resin having a weight average molecular weight of greater than 500,000 and up to 6 million.

* * * * *